United States Patent
Amin-Shahidi et al.

(10) Patent No.: US 11,380,470 B2
(45) Date of Patent: Jul. 5, 2022

(54) METHODS TO CONTROL FORCE IN RELUCTANCE ACTUATORS BASED ON FLUX RELATED PARAMETERS

(71) Applicant: Apple Inc., Cupertino, CA (US)

(72) Inventors: Darya Amin-Shahidi, San Jose, CA (US); Hari Vasudevan, Los Gatos, CA (US); Juil Lee, Pleasanton, CA (US); Denis M. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 465 days.

(21) Appl. No.: 16/581,686

(22) Filed: Sep. 24, 2019

(65) Prior Publication Data

US 2021/0090773 A1 Mar. 25, 2021

(51) Int. Cl.
*H01F 7/18* (2006.01)
*G06F 3/01* (2006.01)
(Continued)

(52) U.S. Cl.
CPC .......... *H01F 7/1844* (2013.01); *G06F 3/016* (2013.01); *G06F 3/041* (2013.01); *H02P 25/08* (2013.01);
(Continued)

(58) Field of Classification Search
CPC .......... G06F 3/016; G06F 3/046; G06F 3/041; G06F 3/03547; H02P 25/08;
(Continued)

(56) References Cited

U.S. PATENT DOCUMENTS 3,001,049 A 9/1961 Didier
3,390,287 A 6/1968 Sonderegger
(Continued)

FOREIGN PATENT DOCUMENTS

AU 2015100710 7/2015
AU 2016100399 5/2016
(Continued)

OTHER PUBLICATIONS

Actuator definition downloaded from http://www.thefreedictionary.com/actuator on May 3, 2018, 2 pages.
(Continued)

*Primary Examiner* — Kevin J Comber
(74) *Attorney, Agent, or Firm* — Brownstein Hyatt Farber Schreck, LLP

(57) ABSTRACT

Disclosed herein are reluctance actuators and methods for feedback control of their applied force. Embodiments of the reluctance actuators include an electromagnet positioned to deflect a metallic plate to provide a haptic output. The control of the force is provided without force sensors (sensorless control) by monitoring voltage and/or current (V/I) applied during an actuation. For a given intended force output, an electrical parameter value (flux, current, or other parameter) is read from a look up table (LUT). The LUT may store a present value of the inductance of the reluctance actuator. The feedback control may be a quasi-static control in which the LUT is updated after actuation based on the monitored V/I. The feedback control may be real-time, with a controller comparing an estimated electrical parameter value based on the measured V/I with the value from the LUT.

20 Claims, 10 Drawing Sheets

(51) Int. Cl.
*G06F 3/041* (2006.01)
*H02P 25/08* (2016.01)
*H02P 25/092* (2016.01)
*H01H 47/04* (2006.01)

(52) U.S. Cl.
CPC ...... *H02P 25/092* (2016.02); *H01F 2007/185* (2013.01); *H01F 2007/1855* (2013.01); *H01F 2007/1861* (2013.01); *H01H 2047/046* (2013.01)

(58) Field of Classification Search
CPC .............. H02P 25/092; H01F 7/1844; H01F 2007/185; H01F 2007/1855; H01F 2007/1861; H01H 2047/046
USPC ........................................................ 318/701
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,035,257 A | 3/2000 | Epperson |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |

(56) References Cited

U.S. PATENT DOCUMENTS

| | | |
|---|---|---|
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,733,540 B2 | 5/2014 | Woiler et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |

(56) References Cited

U.S. PATENT DOCUMENTS

| | | |
|---|---|---|
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn |
| 9,452,268 B2 | 9/2016 | Badaye et al. |
| 9,454,239 B2 | 9/2016 | Elias et al. |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |
| 9,659,482 B2 | 5/2017 | Yang et al. |
| 9,665,198 B2 | 5/2017 | Kies et al. |
| 9,692,286 B2 | 6/2017 | Endo et al. |
| 9,594,450 B2 | 7/2017 | Lynn et al. |
| 9,696,803 B2 | 7/2017 | Curz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,785,251 B2 | 10/2017 | Martisauskas |
| 9,823,833 B2 | 11/2017 | Grant et al. |
| 9,830,782 B2 | 11/2017 | Morrell et al. |
| 9,831,871 B2 | 11/2017 | Lee et al. |
| 9,836,123 B2 | 12/2017 | Gipson et al. |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,069,392 B2 | 9/2018 | Degner et al. |
| 10,108,151 B2 | 10/2018 | Cardinal et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,268,272 B2 | 4/2019 | Chen |
| 10,276,001 B2 | 4/2019 | Smith et al. |
| 10,289,199 B2 | 5/2019 | Hoellwarth et al. |
| 10,338,682 B2 | 7/2019 | Heubel et al. |
| 10,345,905 B2 | 7/2019 | McClure et al. |
| 10,353,467 B2 | 7/2019 | Augenbergs et al. |
| 10,367,950 B2 | 7/2019 | Davis et al. |
| 10,372,250 B2 | 8/2019 | Zhang et al. |
| 10,416,811 B2 | 9/2019 | Abdollahian et al. |
| 10,423,214 B2 | 9/2019 | Mistry et al. |
| 10,429,929 B2 | 10/2019 | Sulem et al. |
| 10,444,834 B2 | 10/2019 | Vescovi |
| 10,444,841 B2 | 10/2019 | Nakamura et al. |
| 10,456,622 B2 | 10/2019 | Szabados et al. |
| 10,459,521 B2 | 10/2019 | Puskarich |
| 10,475,300 B2 | 11/2019 | Hill |
| 10,481,691 B2 | 11/2019 | Utterman et al. |
| 10,481,692 B2 | 11/2019 | Ullrich et al. |
| 10,488,927 B2 | 11/2019 | Lim et al. |
| 10,490,035 B2 | 11/2019 | Morrell et al. |
| 10,503,255 B2 | 12/2019 | Ramstein et al. |
| 10,504,339 B2 | 12/2019 | Birnbaum et al. |
| 10,514,761 B2 | 12/2019 | Rihn |
| 10,540,043 B2 | 1/2020 | Tanemura et al. |
| 10,545,604 B2 | 1/2020 | Bijamov et al. |
| 10,564,721 B2 | 2/2020 | Curz-Hernandez et al. |
| 10,566,888 B2 | 2/2020 | Degner et al. |
| 10,608,162 B2 | 3/2020 | Noguchi |
| 10,609,677 B2 | 3/2020 | Miller et al. |
| 10,622,538 B2 | 4/2020 | Zhang et al. |
| 10,651,716 B2 | 5/2020 | Moussette et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |

(56) References Cited

U.S. PATENT DOCUMENTS

| | | |
|---|---|---|
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0265197 A1 | 10/2010 | Purdy |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1 | 6/2011 | Lee et al. |
| 2011/0163985 A1 | 7/2011 | Bae et al. |
| 2011/0216013 A1 | 9/2011 | Siotis |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0043987 A1 | 2/2013 | Kasama et al. |
| 2013/0058816 A1 | 3/2013 | Kim |
| 2013/0106699 A1 | 5/2013 | Babatunde |
| 2013/0191741 A1 | 7/2013 | Dickinson et al. |
| 2013/0207793 A1 | 8/2013 | Weaber et al. |
| 2013/0217491 A1 | 8/2013 | Hilbert et al. |
| 2013/0261811 A1 | 10/2013 | Yagi et al. |
| 2013/0300590 A1 | 11/2013 | Dietz et al. |
| 2014/0082490 A1 | 3/2014 | Jung et al. |
| 2014/0085065 A1 | 3/2014 | Biggs et al. |
| 2014/0118126 A1* | 5/2014 | Garg ................ G06F 3/016 340/407.1 |
| 2014/0132528 A1 | 5/2014 | Catton |
| 2014/0168153 A1 | 6/2014 | Deichmann et al. |
| 2014/0197936 A1 | 7/2014 | Biggs et al. |
| 2014/0267076 A1 | 9/2014 | Birnbaum et al. |
| 2015/0005039 A1 | 1/2015 | Liu et al. |
| 2015/0040005 A1 | 2/2015 | Faaborg |
| 2015/0098309 A1 | 4/2015 | Adams et al. |
| 2015/0130730 A1* | 5/2015 | Harley ................ G06F 3/016 345/173 |
| 2015/0169059 A1 | 6/2015 | Behles et al. |
| 2015/0194165 A1 | 7/2015 | Faaborg et al. |
| 2015/0205355 A1 | 7/2015 | Yairi |
| 2015/0205417 A1 | 7/2015 | Yairi et al. |
| 2015/0296480 A1 | 10/2015 | Kinsey et al. |
| 2016/0103544 A1 | 4/2016 | Filiz et al. |
| 2016/0241119 A1 | 8/2016 | Keeler |
| 2017/0139405 A1* | 5/2017 | Bodenstein ............ G06F 3/016 |
| 2017/0153703 A1 | 6/2017 | Yun et al. |
| 2017/0242541 A1 | 8/2017 | Iuchi et al. |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0059793 A1 | 3/2018 | Hajati |
| 2018/0060941 A1 | 3/2018 | Yang et al. |
| 2018/0080800 A1* | 3/2018 | Chen ...................... G01D 5/145 |
| 2018/0081441 A1 | 3/2018 | Pedder et al. |
| 2018/0090253 A1* | 3/2018 | Songatikamas ........ G06F 3/0416 |
| 2018/0120938 A1* | 5/2018 | Frescas .................. G06F 3/014 |
| 2018/0302881 A1 | 10/2018 | Miller et al. |
| 2019/0250713 A1 | 8/2019 | Chen |
| 2020/0026359 A1 | 1/2020 | Uttermann et al. |
| 2020/0027320 A1 | 1/2020 | Hill |
| 2020/0389114 A1* | 12/2020 | Creary .................. H02P 25/086 |

FOREIGN PATENT DOCUMENTS

| | | | |
|---|---|---|---|
| CA | 2355434 | 2/2002 | |
| CN | 1324030 | 11/2001 | |
| CN | 1692371 | 11/2005 | |
| CN | 1817321 | 8/2006 | |
| CN | 101120290 | 2/2008 | |
| CN | 101409164 | 4/2009 | |
| CN | 101763192 | 6/2010 | |
| CN | 101903848 | 12/2010 | |
| CN | 101938207 | 1/2011 | |
| CN | 102025257 | 4/2011 | |
| CN | 102057656 | 5/2011 | |
| CN | 201829004 | 5/2011 | |
| CN | 102163076 | 8/2011 | |
| CN | 102246122 | 11/2011 | |
| CN | 102315747 | 1/2012 | |
| CN | 102591512 | 7/2012 | |
| CN | 102667681 | 9/2012 | |
| CN | 102713805 | 10/2012 | |
| CN | 102754054 | 10/2012 | |
| CN | 102768593 | 11/2012 | |
| CN | 102844972 | 12/2012 | |
| CN | 102915111 | 2/2013 | |
| CN | 103019569 | 4/2013 | |
| CN | 103154867 | 6/2013 | |
| CN | 103155410 | 6/2013 | |
| CN | 103181090 | 6/2013 | |
| CN | 103218104 | 7/2013 | |
| CN | 103278173 | 9/2013 | |
| CN | 103416043 | 11/2013 | |
| CN | 103440076 | 12/2013 | |
| CN | 103567135 | 2/2014 | |
| CN | 103970339 | 8/2014 | |
| CN | 104049746 | 9/2014 | |
| CN | 104220963 | 12/2014 | |
| CN | 104917885 | 9/2015 | |
| CN | 104956244 | 9/2015 | |
| CN | 105556268 | 5/2016 | |
| CN | 208013890 | 10/2018 | |
| DE | 19517630 | 11/1996 | |
| DE | 10330024 | 1/2005 | |
| DE | 102008027720 A1 * | 12/2009 | ............ H02P 23/14 |
| DE | 102009038103 | 2/2011 | |
| DE | 102011115762 | 4/2013 | |
| EP | 0483955 | 5/1992 | |
| EP | 1047258 | 10/2000 | |
| EP | 1686776 | 8/2006 | |
| EP | 2060967 | 5/2009 | |
| EP | 2073099 | 6/2009 | |
| EP | 2194444 | 6/2010 | |
| EP | 2207080 | 7/2010 | |
| EP | 2264562 A2 | 12/2010 | |
| EP | 2315186 | 4/2011 | |
| EP | 2374430 | 10/2011 | |
| EP | 2395414 | 12/2011 | |
| EP | 2461228 | 6/2012 | |
| EP | 2631746 | 8/2013 | |
| EP | 2434555 | 10/2013 | |

(56) References Cited

FOREIGN PATENT DOCUMENTS

| | | | |
|---|---|---|---|
| EP | 2148339 B1 * | 7/2015 | ........... H01F 7/1844 |
| JP | H05301342 A2 | 11/1993 | |
| JP | 2001095290 A * | 4/2001 | ................ F01L 9/04 |
| JP | 2002199689 | 7/2002 | |
| JP | 2002102799 | 9/2002 | |
| JP | 200362525 | 3/2003 | |
| JP | 2003527046 | 9/2003 | |
| JP | 200494389 | 3/2004 | |
| JP | 2004236202 | 8/2004 | |
| JP | 2006150865 | 6/2006 | |
| JP | 3831410 | 10/2006 | |
| JP | 2007519099 | 7/2007 | |
| JP | 200818928 | 1/2008 | |
| JP | 2010536040 | 11/2010 | |
| JP | 2010272903 | 12/2010 | |
| JP | 2011523840 | 8/2011 | |
| JP | 2012135755 | 7/2012 | |
| JP | 2013149124 | 8/2013 | |
| JP | 2014002729 | 1/2014 | |
| JP | 2014509028 | 4/2014 | |
| JP | 2014235133 | 12/2014 | |
| JP | 2014239323 | 12/2014 | |
| JP | 2015153406 | 8/2015 | |
| JP | 2015228214 | 12/2015 | |
| JP | 2016095552 | 5/2016 | |
| KR | 20050033909 | 4/2005 | |
| KR | 1020100046602 | 5/2010 | |
| KR | 1020110101516 | 9/2011 | |
| KR | 20130024420 | 3/2013 | |
| TW | 200518000 | 11/2007 | |
| TW | 200951944 | 12/2009 | |
| TW | 201145336 | 12/2011 | |
| TW | 201218039 | 5/2012 | |
| TW | 201425180 | 7/2014 | |
| WO | WO 97/016932 | 5/1997 | |
| WO | WO 00/051190 | 8/2000 | |
| WO | WO 01/059558 | 8/2001 | |
| WO | WO 01/089003 | 11/2001 | |
| WO | WO 02/073587 | 9/2002 | |
| WO | WO 03/038800 | 5/2003 | |
| WO | WO 03/100550 | 12/2003 | |
| WO | WO 06/057770 | 6/2006 | |
| WO | WO 07/114631 | 10/2007 | |
| WO | WO 08/075082 | 6/2008 | |
| WO | WO 09/038862 | 3/2009 | |
| WO | WO 09/068986 | 6/2009 | |
| WO | WO 09/097866 | 8/2009 | |
| WO | WO 09/122331 | 10/2009 | |
| WO | WO 09/150287 | 12/2009 | |
| WO | WO 10/085575 | 7/2010 | |
| WO | WO 10/087925 | 8/2010 | |
| WO | WO 11/007263 | 1/2011 | |
| WO | WO 12/052635 | 4/2012 | |
| WO | WO 12/129247 | 9/2012 | |
| WO | WO 13/069148 | 5/2013 | |
| WO | WO 13/150667 | 10/2013 | |
| WO | WO 13/169299 | 11/2013 | |
| WO | WO 13/169302 | 11/2013 | |
| WO | WO 13/173838 | 11/2013 | |
| WO | WO 13/186846 | 12/2013 | |
| WO | WO 13/186847 | 12/2013 | |
| WO | WO 14/018086 | 1/2014 | |
| WO | WO 14/098077 | 6/2014 | |
| WO | WO 15/023670 | 2/2015 | |
| WO | WO 16/141482 | 9/2016 | |
| WO | WO-2017027792 A1 * | 2/2017 | |

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al., "Haptic Pen: Tactile Feedback Stylus for Touch Screens," Mitsubishi Electric Research Laboratories, http://wwwlmerl.com, 6 pages, Oct. 2004.

Nakamura, "A Torso Haptic Display Based on Shape Memory Alloy Actuators," Massachusetts Institute of Technology, 2003, pp. 1-123.

PuntoCellulare, "LG-GD910 3G Watch Phone," YouTube (http://www.youtube.com/watch?v+HcCl87KIELM), Jan. 8, 2009, 9 pages.

Sullivan, Mark, "This Android Wear Update Turns Your Device into the Dick Tracy Watch," Fast Company (https://www.fastcompany.com/3056319/this-android-wear-update-turns-your-device-into-the-dick-tracy-watch), Feb. 4, 2016, 9 pages.

* cited by examiner

US 11,380,470 B2

METHODS TO CONTROL FORCE IN RELUCTANCE ACTUATORS BASED ON FLUX RELATED PARAMETERS

FIELD

The present disclosure generally relates to magnetic reluctance actuators and methods of providing haptic output by such reluctance actuators, and more particularly to control using measurements of magnetic flux, inductance, and other parameters, either before or during actuation.

BACKGROUND

Electronic devices are commonplace in today's society. Example electronic devices include cell phones, tablet computers, personal digital assistants, and the like. These electronic devices may provide a haptic (touch/vibration) output to provide information, responses, or alerts to a user. Examples of such haptic outputs are vibrations on a computer trackpad or vibrations on a cellphone, among others.

Such haptic outputs can be provided by an actuator, which may take the form of an electromechanical device that deflects or otherwise moves a flexible component. For a quality user experience, the amount of force provided by a haptic actuator may be monitored and controlled by a control system. Some control systems use feedback with a direct measurement of the output being provided. In the case of a force output from a haptic actuator, the feedback would be of direct measurements of the force it applies. This may be done directly through use of force sensors positioned on the component of the actuator, such as a plate, that provides the haptic output. This can require multiple force sensors, such as strain sensors, positioned on the flexible component.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are devices that include reluctance actuators, and also methods for the control of forces provided by such reluctance actuators. A reluctance actuator can include an electromagnet positioned near a metallic object or plate so that a current in the electromagnet (an actuation) induces a magnetic flux (or just 'flux') that induces a force of attraction on the metallic object. The metallic object may be a ferritic plate positioned near a mostly planar coil forming the electromagnet. Various methods are presented for control of the force provided by such reluctance actuators. The methods may make use of a correlator component, such as a look up table, that may be updated based on feedback. The methods may use sensorless control feedback, in that the force output of the reluctance actuators is not measured directly, but is estimated based on electrical parameters of the reluctance actuators related to the magnetic flux. Such electrical parameters of the reluctance actuators include, but are not limited to, any of measurements of the current and/or voltage in the reluctance actuator during actuation, measurements or estimates of the magnetic flux itself, and estimates of an inductance and a resistance of the reluctance actuator.

More specifically, described herein is a method of controlling force applied by a reluctance actuator. The method includes receiving an intended force output to be applied by the reluctance actuator, and obtaining from a correlator component, such as a look up table (LUT), based at least on the intended force output and a stored estimate of an electrical parameter value of the reluctance actuator, an input parameter to be applied to the reluctance actuator. The method includes applying the input parameter to the reluctance actuator to cause an actuation of the reluctance actuator; obtaining at least one of a measurement of a current or a measurement of a voltage in the reluctance actuator during the actuation, estimating at least one of a resistance of the reluctance actuator, an inductance of the reluctance actuator, and a magnetic flux produced by the reluctance actuator using the at least one of the measurement of the current and the measurement of the voltage; and updating the stored estimate of the electrical parameter value of the reluctance actuator of the correlator component based on the at least one estimate of the resistance of the reluctance actuator, the inductance of the reluctance actuator or the magnetic flux produced by reluctance actuator.

In additional and/or alternative embodiments, the input parameter may be a voltage value or a current value to be applied by a driver to the reluctance actuator. The methods may include updating the stored estimate of the electrical parameter value of the reluctance actuator after the actuation. A measurement of the magnetic flux produced by the reluctance actuator during the actuation from a magnetic flux sensor associated with the reluctance actuator may be used as part of estimating the inductance of the reluctance actuator.

Also described herein are haptic actuators that include a reluctance actuator and control electronics for the reluctance actuator. The reluctance actuator may include a metallic plate and an electromagnet positioned adjacent to the metallic plate; the control electronics may include a correlator component, such as a look up table (LUT), a driver component operably linked with the electromagnet, and an estimation component. The control electronics may be operable to receive a force trajectory, and determine an input parameter for the driver component using the force trajectory as an input to the correlator component. The input parameter may be applied to the driver component to cause an actuation of the reluctance actuator, the estimation component may monitor at least one of a voltage or a current in the reluctance actuator, and the correlator component may be updated based on the monitored value of at least one of the voltage and the current in the reluctance actuator.

In additional and/or alternative embodiments, the correlator component of the haptic actuators may store an estimate of an electrical parameter value of the reluctance actuator, and use the stored estimate of the electrical parameter value of the reluctance actuator with the force trajectory to determine the input parameter for the driver component. The driver component may be a current amplifier and the input parameter may be a current value. The driver component may be a voltage amplifier and the input parameter may be a voltage value. The control electronics may include a controller component that provides a feedback control input to the driver component based on the monitored value of the current in the reluctance actuator.

The control electronic components may further include a magnetic flux estimator operable to determine an estimate of the magnetic flux in the reluctance actuator during the actuation based on the monitored values of the voltage and the current in the reluctance actuator and provide the estimate of the magnetic flux to the controller element. Additionally and/or alternatively, the control electronics components may further include a magnetic flux sensor associated with the electromagnet and operable to obtain a measurement of the magnetic flux in the reluctance actuator during the actuation, and provide the measurement of the magnetic flux to the magnetic flux estimator.

Also described herein are methods of control of a force applied by a reluctance actuator that includes an electromagnet and a flexible metallic plate. The method includes receiving an intended force output, and determining, using a correlator component, such as a look up table (LUT), based on the intended force output and an initial value of an electrical parameter value of the reluctance actuator, an input parameter. The method includes receiving at a feedback controller the input parameter and a feedback value of the electrical parameter value of the reluctance actuator. The methods may include: applying, by the feedback controller, an input drive value to a driver component, the input drive value based on the input parameter and the feedback value of the electrical parameter value of the reluctance actuator; applying, by the driver component, an output drive value to the electromagnet to actuate the reluctance actuator; measuring a current in the reluctance actuator during the actuation; and using the measured current to determine the feedback value of the electrical parameter value of the reluctance actuator. The input parameter of the electrical parameter may be a current.

In additional and/or alternative embodiments, the input drive value is a first input drive value, and the methods may include determining, based on the input parameter, a second input drive value; and applying the second input drive value to the driver component by a feed-forward component. The methods may include measuring a voltage in the reluctance actuator during the actuation, determining an estimated resistance and an estimated inductance of the reluctance actuator based on the measured current and voltage, and updating the LUT by replacing the initial value of the inductance of the reluctance actuator with the estimated inductance of the reluctance actuator.

The input value of the electrical parameter may be an input value of a magnetic flux, and the methods may further include estimating a magnetic flux in the reluctance actuator during the actuation based on the measured voltage and current in the reluctance actuator during actuation, and using the estimated magnetic flux in the reluctance actuator as the feedback value of the electrical parameter received at the feedback controller. Additionally and/or alternatively, the methods may include receiving, from a magnetic flux sensor associated with the electromagnet, a measurement of a magnetic flux in the reluctance actuator during the actuation, and using the measurement of the magnetic flux in the reluctance actuator as the feedback value of the electrical parameter received at the feedback controller.

BRIEF DESCRIPTION OF THE DRAWINGS

The disclosure will be readily understood by the detailed description in conjunction with the accompanying drawings, wherein like reference numerals designate like structural elements.

Figure 1A:
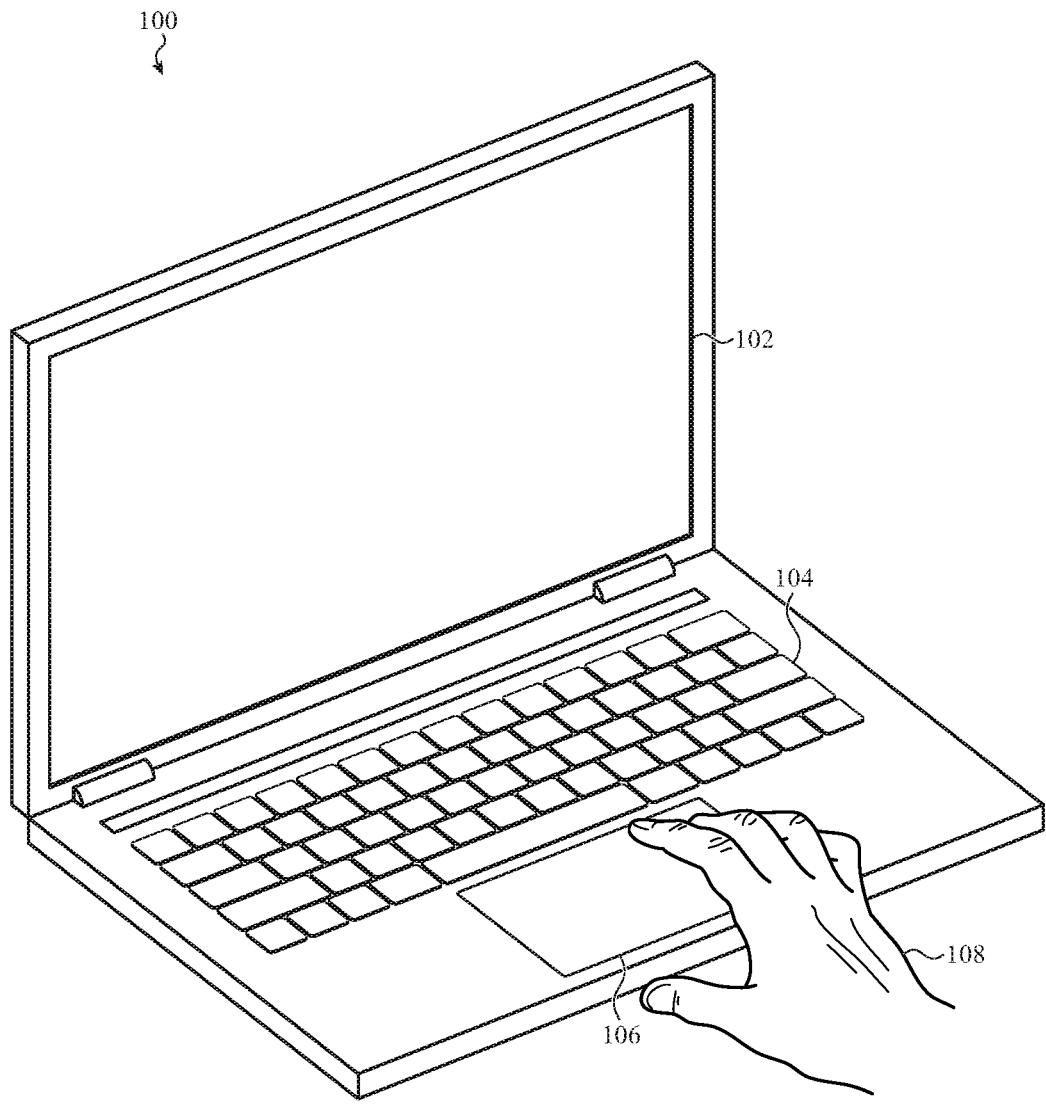
FIG. 1A illustrates a laptop computer with a trackpad.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to haptic output devices having reluctance actuators, and to systems and methods controlling the reluctance actuators. Examples of such devices include, but are not limited to, trackpad, buttons, switches, display screens, housings, or other haptic output surfaces of an electronic device.

The reluctance actuators described herein include an electromagnet positioned adjacent to, or sufficiently close to, a metallic object or plate, which may be ferromagnetic, so that a magnetic field produced by the electromagnet induces a magnetic field within the metallic object. For simplicity of exposition, hereinafter the metallic object will be presumed to be a plate, though one skilled in the art will recognize that the reluctance actuators can use metallic objects with other geometries or shapes. The electromagnets are positioned so that when a current is induced through them, the magnetic field is directed toward the metallic plate. Physically, the magnetic flux preferentially tends to be contained in the metallic plate, resulting in a force applied to the metallic plate that attracts it toward the electromagnet.

The applied force may cause the metallic plate to bend or flex. By applying an appropriate current pattern over time, such as a simple sinusoid or a more complex current pattern, a corresponding intended force output (or "force trajectory") can be applied to the metallic plate. The resulting flexing or bending of the metallic plate can be used to induce a respective haptic (touch) output pattern. An intended force output or force trajectory may also be a constant value, such as to produce a divot, bump, or other deflection of a surface as a haptic output of a device.

The embodiments described herein include feedback methods for controlling the actual force output produced by a reluctance actuator. The methods include both quasi-static and real-time feedback control. In quasi-static feedback control, adjustments of the parameters of, or inputs to, the reluctance actuator that cause its actuation (such as a current needed to induce the force output) are made after an actuation and a determination that adjustment is needed. In real-time feedback control, adjustments to those inputs to the reluctance actuator that cause its actuation are adjusted continuously (or near-continuously, or at specific intervals across a period of time). A goal of both such feedback control methods is to ensure an actual value of an output (such as the force applied by the reluctance actuator) equals an intended or desired value of that output, or at least that the actual value is practicably close to the intended or desired value.

Feedback control of a force output provided by reluctance actuators may compensate for manufacturing variances and component drift over time and usage. A goal is to provide a consistent, uniform output force. As an example, a trackpad of a laptop computer may provide a haptic (or touch) output in response to a certain user input, such as providing a "click" feel when the user presses to activate a program of an icon displayed on the laptop's screen. User experience is improved if this feel is consistent between devices and over time.

Feedback control is often implemented by directly measuring the actual value of the output of interest (e.g., the output that results from the control). In the case that the output of interest is the force applied to the metallic object of a reluctance actuator, direct measurement of the force would require force sensors, such as piezoelectric sensors, piezoresistive sensors, strain gauges, or the like, to be attached to the metallic object. This could add complexity and cost to an associated electronic device.

Various embodiments described herein are directed to non-direct feedback control of a force output from a reluctance actuator. Instead of directly measuring an output force, other parameters of the reluctance actuator are measured to estimate or infer the actual output force provided, and to adjust operation (feedback) of the reluctance actuator. Two such parameters that can be measured or monitored are the current and the voltage in the reluctance actuator during the actuation. Another parameter, which may be directly measured, is the magnetic flux. While the magnetic flux may be directly measured by any of various sensors, it provides an indirect parameter value to be used for feedback control of the reluctance actuator's actual output force.

As haptic outputs typically occur briefly over a limited amount of time, quasi-static feedback control may suffice. In quasi-static feedback control, adjustments are made to the reluctance actuator or its control electronics after an actuation.

In various embodiments disclosed herein, the control electronics for a reluctance actuator include a correlator component that takes in (or receives) at least a desired or intended force output, and provides an input parameter (such as a voltage or current value) that is used by other control electronics to drive the reluctance actuator so as to produce the intended force output. Such a correlator component may be implemented, in various embodiments, as a look up table (LUT). Such a LUT may be implemented as a one-, two-, or higher dimensional table or array (depending on the number of received inputs at the correlator component) from which the provided input parameter is read off. Such a table may be implemented as an integrated circuit comprising a memory storing the table. Such a memory may be modifiable, as will be discussed in the families of embodiments described below. In other embodiments, a correlator component may be implemented as: a processor or processing components running software programs that calculates the input parameter, as an application specific integrated circuit producing an output or signal correlated with the input parameter; or by other electronic circuits or components. In the embodiments to be described, the correlator component or its operations may by modifiable using feedback based on an observed haptic output of the haptic actuator.

The correlator component may be modifiable in order to account for variations of the components of the reluctance actuator due to manufacture and usage. As an example, in the case that the correlator component is a LUT, implemented as a two-dimensional (or even higher dimensional) array, the LUT may additionally receive or take in one or more entries corresponding to properties of the reluctance actuator to provide the input parameter.

For example, such a LUT may need the desired force output as a first entry and an inductance value of the reluctance actuator to read out the corresponding input parameter with which to drive the reluctance actuator. Such a LUT would have the desired force output as a first dimension of the 2D array, with inductance as a second dimension. One value of the inductance can be stored as a present estimate (pending further update) of the inductance of the reluctance actuator.

At manufacture of an electronic device, an associated correlator component may have stored estimates or values (in the case of a LUT) or software operations (in the case a software-implemented correlator component) based on design characteristics. However, due to manufacturing variances or drifts in electronic component values, further updates based on feedback control (either quasi-static or real-time) during usage may be made.

In various embodiments, one or both of quasi-static or real-time feedback control of the force output provided by a reluctance actuator may make use of estimates of the inductance and/or resistance of the reluctance actuator obtained during actuation. These estimates may be based on measurements of the current and/or voltage across the reluctance actuator during actuation. Current and voltage sensing may be implemented as part of a driver component for the reluctance actuator.

These and other embodiments are discussed below with reference to FIGS. 1A-9. However, those skilled in the art will readily appreciate that the detailed description given herein with respect to these Figures is for explanatory purposes only and should not be construed as limiting. In particular, for simplicity of explanation only, in the exemplary embodiments now to be described, the correlator component will be assumed to be a LUT. One skilled in the art will recognize that other implementations of a correlator component may be used in place of the LUT.

Further, although specific electronic devices are shown in the figures and described below, the reluctance actuators described herein may be used with various electronic devices including, but not limited to, mobile phones, personal digital assistants, a time keeping device, a health monitoring device, a wearable electronic device, an input device (e.g., a stylus), a desktop computer, electronic glasses, and so on. Although various electronic devices are mentioned, the reluctance actuators and methods of their control described in the present disclosure may also be used in conjunction with other products and combined with various materials.

FIG. 1A illustrates an example electronic device 100 that may incorporate one or more reluctance actuators and associated control methods according to one or more embodiments of the present disclosure. The electronic device 100 in this example is a laptop computer. The electronic device 100 includes a display screen 102 on which visual output may be displayed. The electronic device 100 includes a keyboard 104 by which a user 108 may enter data and/or instructions for operations.

The electronic device 100 also includes a trackpad 106 through which the user 108 can move a cursor, enter data, or enter commands by touch or force applied to the trackpad 106. The trackpad 106 may include a reluctance actuator to provide haptic output or feedback to the user 108. Although FIGS. 1A-1B show different electronic devices 100 and 110, like reference numerals are used to designate similar components.

Figure 1B:
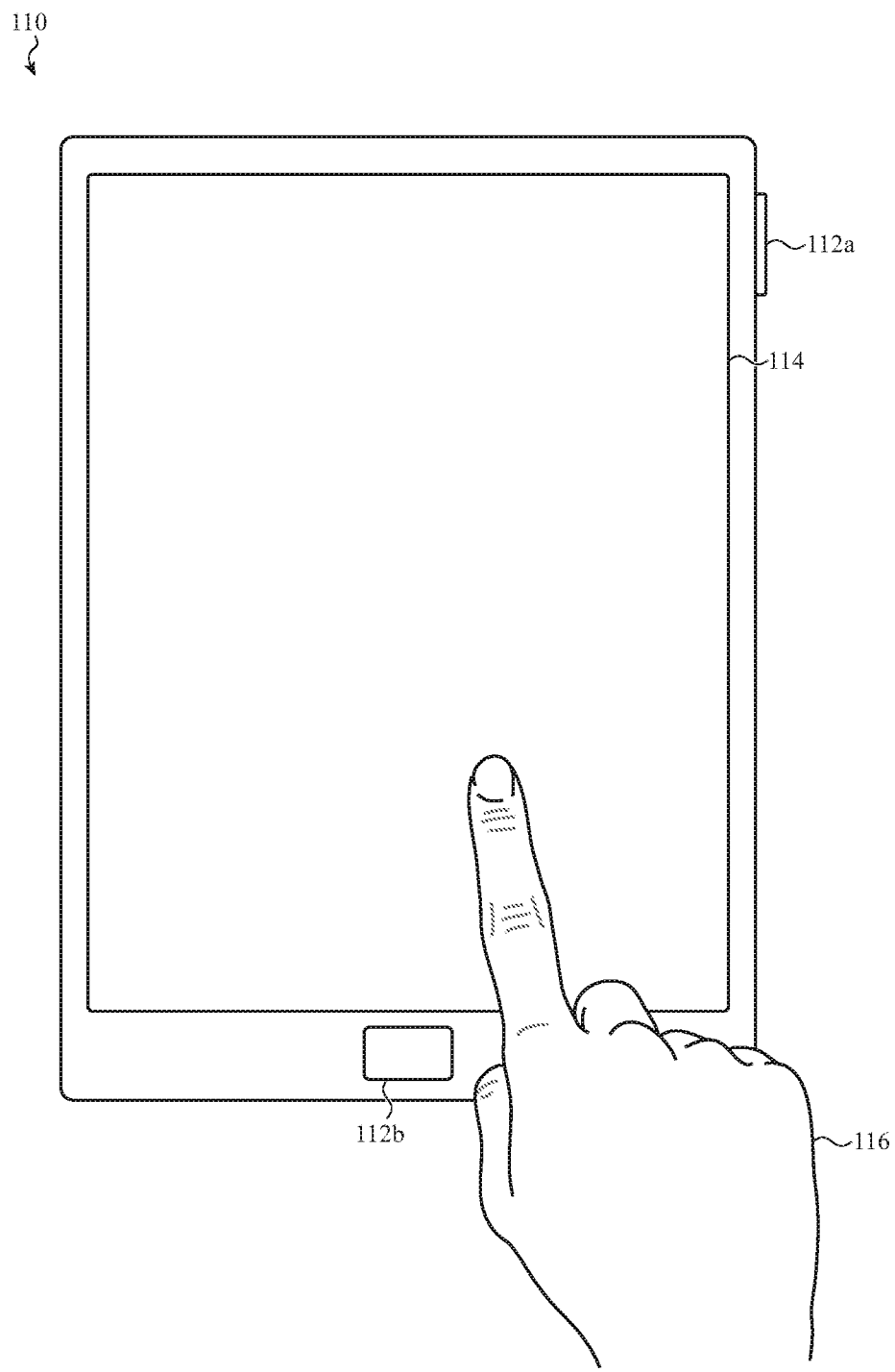
FIG. 1B illustrates a tablet computer.

FIG. 1B illustrates a second example electronic device 110 that may incorporate one or more reluctance actuators and associated control methods according to one or more embodiments of the present disclosure. The electronic device 110 in this example is a tablet computer. A smart phone may be another example electronic device that has an analogous configuration of components and may incorporate one or more reluctance actuators and associated control methods. The electronic device 110 includes a display screen 114 on which visual output may be displayed. The electronic device 110 includes two button entries 112a and 112b by which a user 116 may alter operation of the electronic device 110, such as change volume settings, turn on/off, etc.

A user 116 may move a cursor, enter data, or enter commands by touch or force applied to the display screen 114. The display screen 114 may include one or more reluctance actuators to provide haptic output or feedback to the user 116.

Figure 2A:
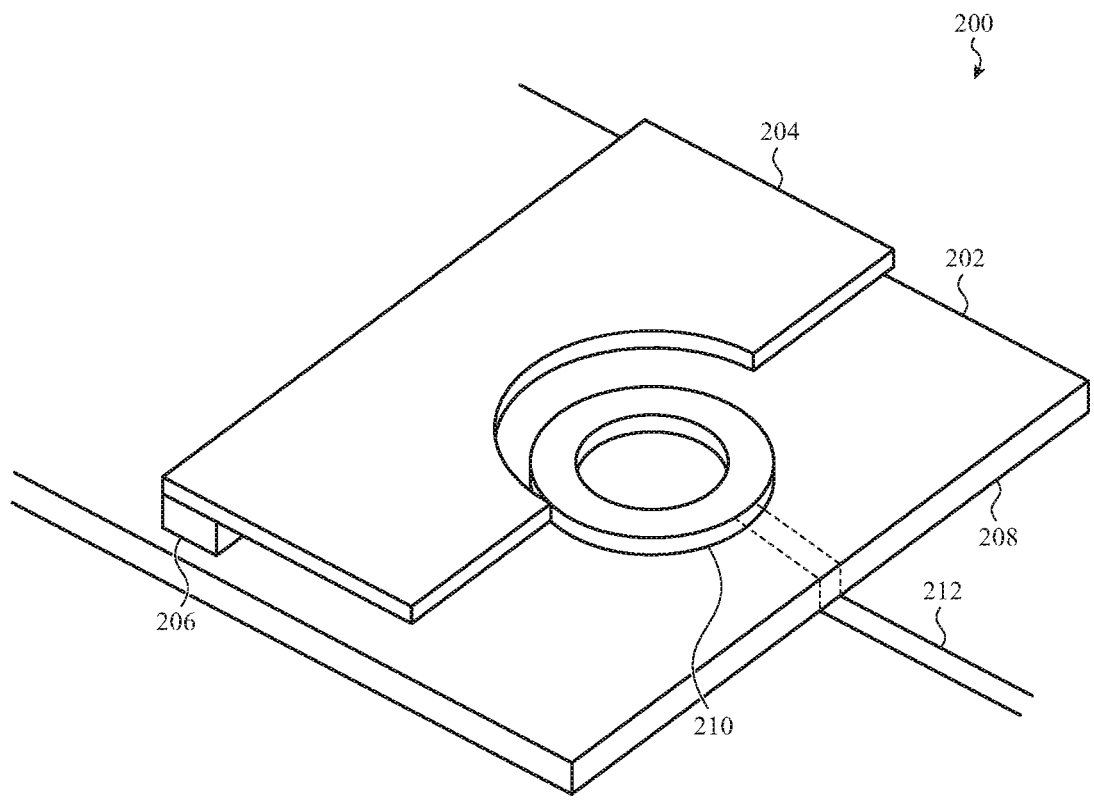
FIG. 2A shows a cut away view of a reluctance actuator.

FIG. 2A shows a cutaway view of an example configuration of a reluctance actuator 200, such as may be used with the electronic devices described in FIGS. 1A-B, or other electronic devices. The reluctance actuator 200 includes a metallic plate 204, which may be able to deflect or flex. The metallic plate 204 is shown partially cutaway to show components underneath, and may extend as a plane further over those components. The metallic plate 204 may be positioned against or proximate to an interior surface of the electronic device to provide a haptic output on a surface of the electronic device as it flexes or deflects. Though in the example configuration of FIG. 2A the reluctance actuator includes the metallic plate 204, in other embodiments, the plate may be replaced by a disk or another shape that can be attracted electromagnetically to an electromagnet 210 (described in more detail below), and so cause a haptic output as a result. The metallic plate 204 may include a ferritic metal, such as a steel alloy, ALNICO, or alloys using nickel, cobalt, or others so that the metallic plate is ferromagnetic.

The reluctance actuator 200 may be situated on a support surface 202 of the electronic device, which may be a printed circuit board, mid plate, structural support, enclosure, or the like. In some embodiments, the support surface 202 may be affixed on its bottom side 208 to further structures within the electronic device, or may be affixed by one or more connectors to other structures. The metallic plate 204 may be supported above the support surface 202 on supports 206, as shown further in FIG. 2B.

The example configuration of the reluctance actuator 200 also includes at least one electromagnet 210 situated in, under, or on the support surface 202. The electromagnet 210 may be configured as a mostly planar coil of wires (shaped, for example, as a toroid or elongate ovoid), so that its vertical dimension may be small with respect to a lateral dimension. In other embodiments other configurations may be used. The electromagnet 210 may have electrical contacts 212 that extend to a source of electrical power, such as a voltage source or current source, and other control electronics, as described further below. The electrical contacts 212 may be implemented as leads on, in, or below the support surface 202, which may be a printed circuit board, or as wires extending to other electronics, or as another implementation.

The electromagnet 210 may be connected to control electronics (as described below) through the electrical contacts 212. The control electronics can provide an alternating or other current through the electrical contacts 212 so that the electromagnet 210 produces a magnetic flux, as described further below.

Figure 2B:
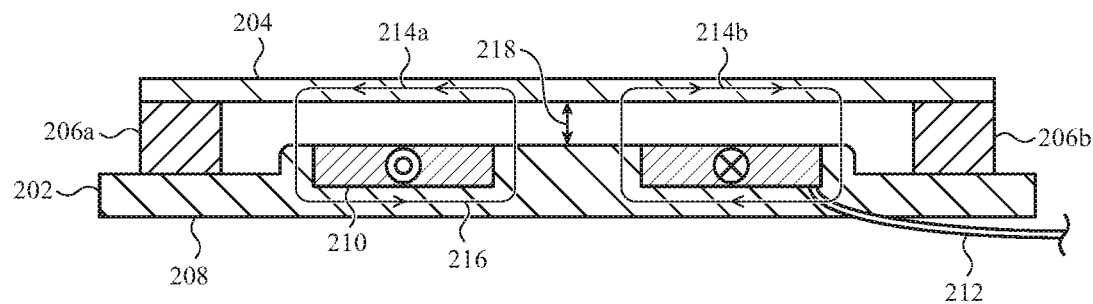
FIG. 2B shows a side view of a reluctance actuator.

FIG. 2B shows a cross-section view of the example reluctance actuator 200. The metallic plate 204 is shown supported above the support surface 202 by supports 206a and 206b. Though only the two supports 206a and 206b are shown, the metallic plate 204 may be supported by another number of supports. In the example configuration shown, the metallic plate 204 is supported at its edges so as to be able to flex near its center upon actuation. However, other mounting configurations may be used, such as a cantilever configuration, in which an edge or side of the metallic plate 204 is free to flex upon actuation. The supports 206 may be either rigid or flexible, depending on the amount and nature of the haptic output desired for the electronic device.

In the embodiment shown in FIG. 2B, the electromagnet 210 is shown as embedded in the support surface 202 with the electrical contacts 212 extending exterior through the support surface 202. One skilled in the art will recognize that such a configuration is not necessary, as other embodiments may have the electromagnet 210 mounted on top of the support surface 202, while still other embodiments may have the electromagnet 210 mounted below the support surface 202.

A current flowing in the electromagnet 210 induces magnetic flux around its coils, as indicated by the magnetic flux lines 214a and 214b above the electromagnet 210 and their continuation 216 below the electromagnet 210. In embodiments in which the metallic plate 204 is ferromagnetic, the portions of the magnetic flux lines 214a and 214b above the electromagnet 210 are induced to be mostly confined to the metallic plate 204 and generate a force of attraction with the electromagnet 210 that tends to reduce the gap distance 218. Flexing of the metallic plate 204 under this force can be used to generate a haptic output on a surface of an electronic device. The metallic plate 204 may be ferromagnetic to produce a relatively stronger deflection force in the metallic plate 204 than if it were made of a paramagnetic or diamagnetic material, though such materials may be used if smaller forces or flexes are preferred.

For the example reluctance actuator 200 shown, the force on the metallic plate 204 is given by $F=\Phi^2/2\mu_0 n^2 A_c$, where n is the number of windings, $\Phi$ is the magnetic flux, $A_c$ is the cross-sectional area, and $\mu_0$ is the permeability of free space. The values of n and $A_c$ are determined by design specification, though $A_c$ may be subject to manufactured variations. For the configuration of the reluctance actuator 200 shown, this formula becomes $F=\mu_0 n^2 A_c/2(I/g)^2$, where I is the current and g is the gap distance 218. This reduces to the form $F=\mu_0 n^2 A_c/2(LI)^2$, showing the force F in terms of the current I and the inductance L of the actuator. One consequence is that the flux Φ is proportional to the square root of the force, or that the current I is proportional to the square root of the force divided by the inductance. These are non-linear relationships between the intended force output and the controllable inputs to the reluctance actuator 200.

A direct measurement of the force applied by the reluctance actuator 200 on its metallic plate 204 could be implemented using force sensors, such as piezoelectric sensors, piezoresistive sensors, or another type, and would require further wiring and control components. It some embodiments it may be preferable to infer the applied force based on measurements of other parameters of the actuator. Examples of such embodiments are as now presented.

Figure 3:
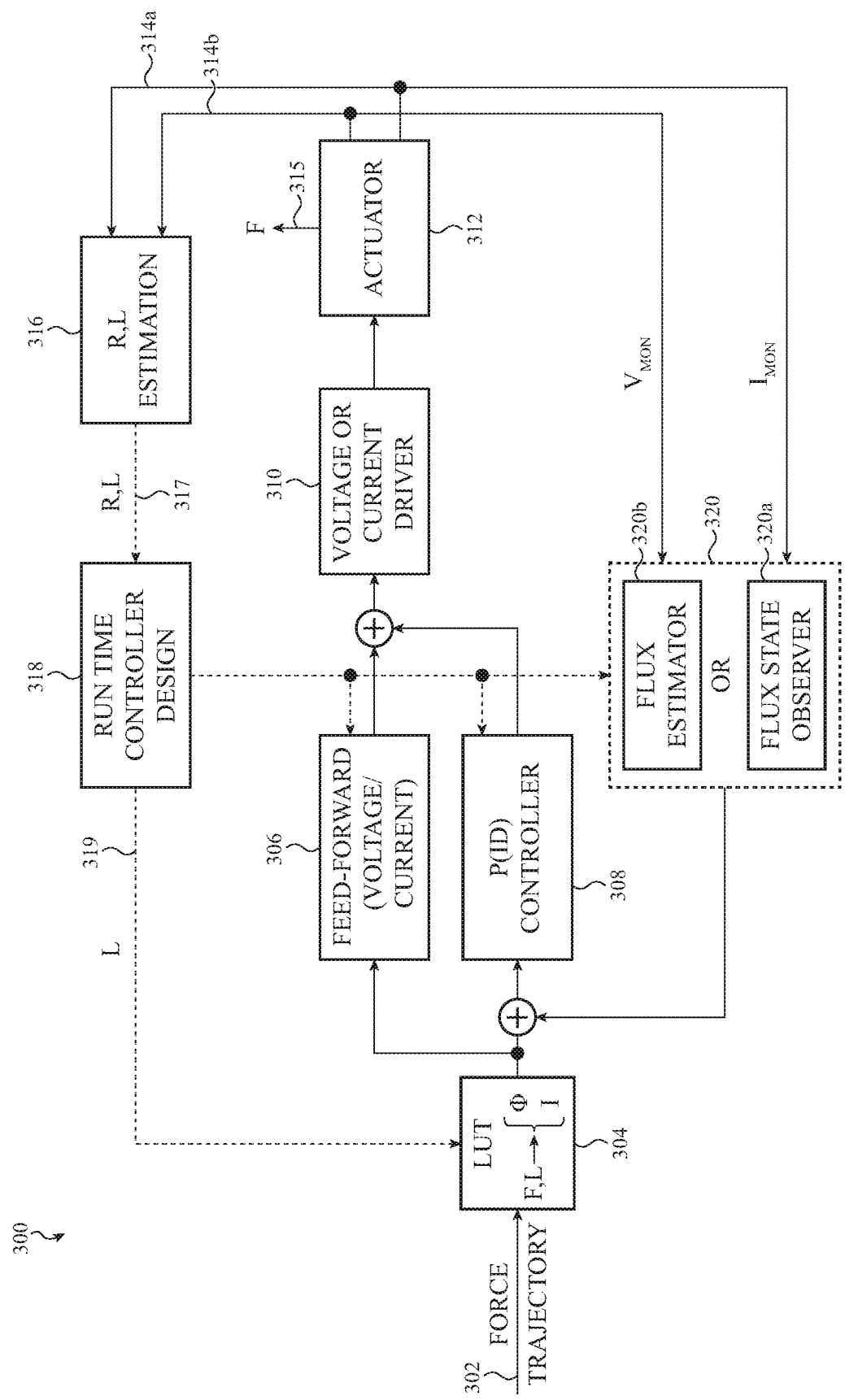
FIG. 3 is a block diagram of components of control systems that may be used with reluctance actuators.

FIG. 3 is a block diagram showing components of example systems 300 that may be used, such as by a haptic actuator of an electronic device, to control an actual output force 315 applied by the reluctance actuator 312. Various embodiments described herein may use fewer or more components than depicted. The particular components shown may be implemented as single electronic or electromagnetic components, such as single integrated circuits, or as multiple such components. In some embodiments of the example systems 300, various components and/or their operations may be implemented by software running on a processor or other computational electronics.

A force trajectory 302 is received as an input to the systems 300. The force trajectory 302 may be an intended force output to be provided by the reluctance actuator 312, or a signal or information from which the systems 300 can infer the intended force output. The force trajectory 302 may be a single value of a force, such as to be provided at one time, or a sequence or waveform of force for the intended force output to be provided by the reluctance actuator 312 over a time interval. The force trajectory 302 may be produced by processors or other electronic processing components (not shown) of an electronic device. The force trajectory 302 may be intended to provide a haptic output as a response to a user input to the electronic device.

The example systems 300 may use the force trajectory 302 as an input to a correlator component 304 to determine and provide a value or values of an input parameter. In the specific example systems 300 shown, the correlator component is implemented as a look up table (LUT) 304, but a different implementation of the correlator component may be used. Such a provided input parameter may be an electronic parameter value, to be used by other components of the systems 300. The input parameter or electronic parameter value may be a current value (I), voltage value, magnetic flux value (Φ), resistance, inductance or another parameter value to be applied to, or provided by, the reluctance actuator 312. Such an input parameter or electronic parameter value may be in the form of an analog or digital signal to be used as by other components of the systems 300 to produce an actual output force 315.

In the embodiment shown, the LUT 304 may also contain, or be provided with, a value L for the inductance of the reluctance actuator 312 as part of determining the input parameter. In such embodiments, the LUT 304 may be configured as a 2-dimensional array. In the embodiment shown, the determined input parameter may be one of the electrical parameter values of current (I) or magnetic flux (Φ). Other embodiments may determine a different electrical parameter value from the LUT 304 using a stored inductance value of the reluctance actuator and the given force trajectory 302.

Certain embodiments of the systems 300 may include any combination of the feed-forward component 306, the controller element 308, and the magnetic flux feedback component 320. Still other embodiments of the systems 300 may not use any of these three components.

The input parameter may be applied as an input to the controller element 308, which may be based on proportional control, and may not use feedback, or may be a proportional/integral/derivative (PID) controller that accepts a feedback signal from the magnetic flux feedback component 320. The input parameter may be applied as an input to a feed-forward component 306, which may convert or condition the input parameter to a form to apply to a driver component 310 that causes actuation of the reluctance actuator 312. The output signal of the feed-forward component 306 may be combined with the output signal of the controller element 308 to apply to the driver component 310 that causes actuation of the reluctance actuator 312. The combination of the output signals may be additive (as shown) or subtractive, or another combination.

The driver component 310 may use the input signal to determine a corresponding output signal to apply to the reluctance actuator 312. In some embodiments, the driver component 310 is a voltage amplifier that amplifies and/or conditions its input signal to provide an output voltage signal for driving the reluctance actuator 312 to produce an actual output force 315. In other embodiments, the driver component 310 is a current amplifier that amplifies and/or conditions its input signal to provide an output current signal for driving or causing actuation of the reluctance actuator 312 to produce an actual output force 315.

The reluctance actuator 312 accepts a driving signal and operates to create an actual output force 315 corresponding to the driving signal. For example, a driving signal that is a current provided by the driver component 310 can induce a force as explained above in relation to the reluctance actuator 200.

Various embodiments of the systems 300, explained in more detail below, can use various feedback mechanisms and methods to reduce differences between the given force trajectory 302 (and its associated intended force output) and the actual output force 315. These embodiments are designed to avoid direct measurements of the actual output force 315, since such measurements would require the use of force sensors and associated electronics, such as on the metallic plate 204 of the reluctance actuator 200.

The feedback mechanisms and methods may use measuring or monitoring a current 314a and/or a voltage 314b in the reluctance actuator 312 during an actuation. The current 314a and voltage 314b may be sensed at the output of the driver component 310, across the electrical contacts 212 in the reluctance actuator 200, or at another location. In some embodiments, a magnetic flux sensor may be included to measure directly a magnetic flux, such as that produced by the electromagnet 210 of FIG. 2A. The measurements of any or all of the current 314a, the voltage 314b, and the magnetic flux may be used as inputs for feedback.

One feedback component is the resistance and/or inductance (R/L) estimation component 316. The R/L estimation component 316 can use one or both of the current 314a and the voltage 314b to obtain an estimate of a resistance R and an inductance L of the reluctance actuator 312. The resistance R may be estimated as the ratio of the voltage 314b to the current 314a, though other estimation methods to obtain R may be used. The inductance L may be estimated, in embodiments in which the current 314a is an alternating current, by a phase difference between the current 314a and the voltage 314b. Other methods for estimating L may be used.

The output(s) 317 of the R/L estimation component 316 may be used as inputs to a run time controller component 318. The run time controller component 318 may adapt the output(s) 317 to provide a real-time feedback to any of the feed-forward component 306, the controller element 308, and the magnetic flux feedback component 320. Each of these three components may produce their respective outputs based on present or stored estimates of the resistance R or the inductance L of the reluctance actuator 312. As manufacturing variations, or drifts due to usage, in R and/or L may occur, the outputs of the R/L estimation component 316 may be used to update those stored estimates.

The R/L estimation component 316 may provide an output 319 to the LUT 304. In some embodiments, the output 319 is an estimated value of the inductance L of the reluctance actuator 312. The output 319 may be used to update one or more inductance values in the LUT 304. The update may be done in a quasi-static mode, in which the update is performed after the actuation.

The systems 300 may include a magnetic flux feedback component 320, that may use one or both of the measured current 314a and the measured voltage 314b to estimate a magnetic flux produced in the reluctance actuator 312. The magnetic flux feedback component 320 may additionally or alternatively receive a measurement from a magnetic flux sensor that may be included as part of the reluctance actuator 312. The magnetic flux feedback component 320 may use a magnetic flux estimator 320b that indirectly estimates a magnetic flux based on the current 314a and the voltage 314b. Additionally and/or alternatively, the magnetic flux feedback component 320 may use a magnetic flux state observer 320a that may use a measurement of the magnetic flux in the reluctance actuator 312 obtained from a magnetic flux sensor. The output of the magnetic flux feedback component 320 may be provided to the controller element 308 as an additional input for it to use to determine the value to provide to the driver component 310.

As stated previously, particular embodiments of the systems 300 may use only certain parts of the components just described. Also, other components not shown in FIG. 3 may also be used, such as power supply components, signal buffers, analog-to-digital converters, or other components. Particular embodiments will now be described.

Figure 4:
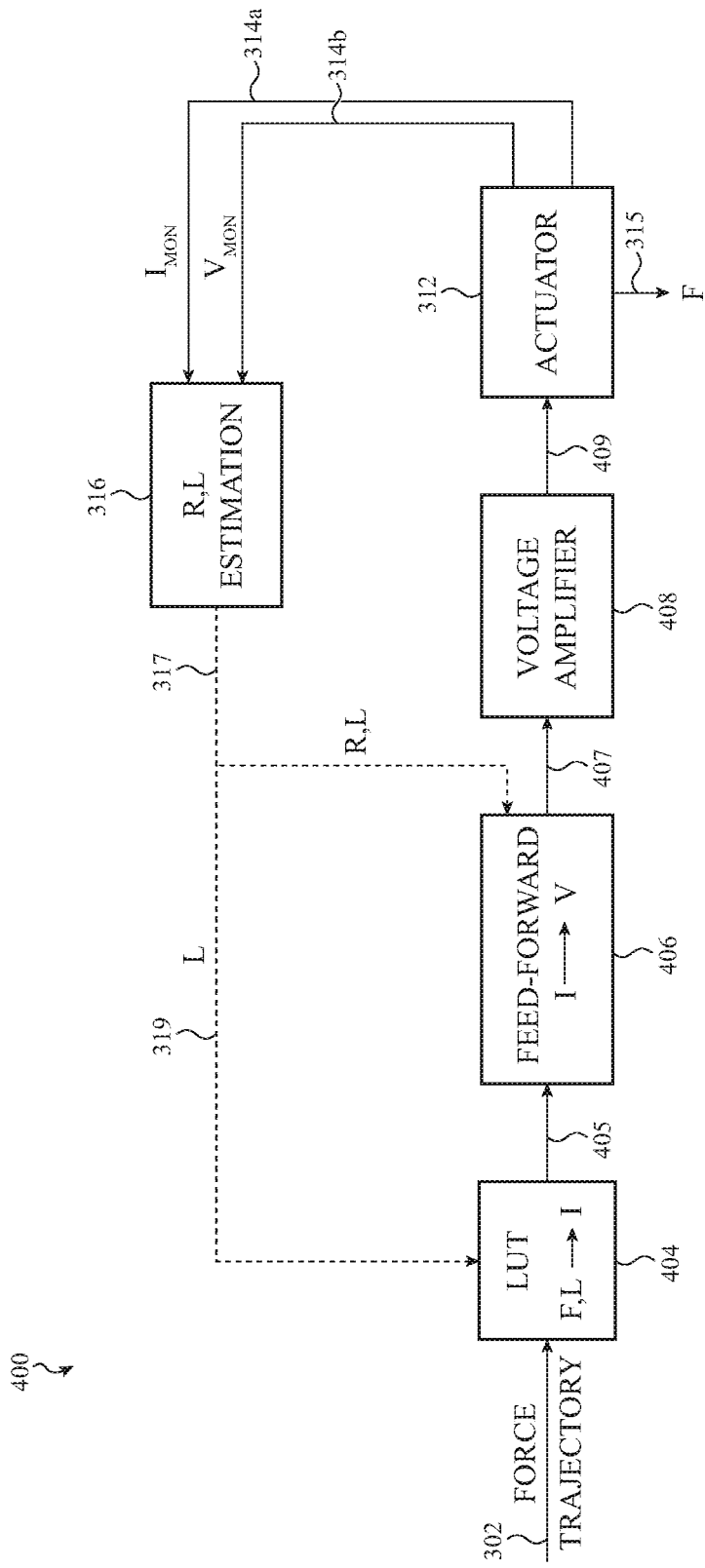
FIG. 4 is a block diagram of components of a control system for a reluctance actuator.

FIG. 4 is a block diagram of a system 400 for controlling the output force 315 applied by the reluctance actuator 312. The system 400 is based on the system 300 and is directed to providing primarily quasi-static, or non-real-time, feedback for control, with an option for real-time control. The reluctance actuator 312 may be as described above in relation to FIG. 3.

The system 400 is configured to receive a force trajectory 302, as described above. The force trajectory 302 is used with a correlator component 404, which, in the specific example shown is the look up table (LUT) 404. In other embodiments of the system 400, another form of correlator component may be used. The LUT 404 may be a 2-dimensional array that uses as inputs both the force trajectory 302 with a stored estimate of inductance of the reluctance actuator 312. The system 400 uses the force trajectory 302 with a stored estimate of inductance of the reluctance actuator 312 to obtain an input parameter 405 to be applied or read by the feed-forward component 406. In the system 400, the input parameter 405 is an electrical parameter value. In the case shown, it is a current value. This current value may be a value for current that the reluctance actuator 312 is to use during an actuation, or may be a value related to such a current (such as a digital representation thereof).

In the system 400, the feed-forward component 406 may use the input parameter 405 to determine an input voltage value to apply to the voltage amplifier 408. The voltage amplifier 408 may buffer or amplify the input voltage value applied to produce the output drive value 409 of a voltage needed to drive the reluctance actuator 312 into actuation.

As described above, the current 314a and the voltage 314b of the reluctance actuator 312 may be measured or monitored during the actuation. The measured values of the current 314a and the voltage 314b may be used by the R/L estimation component 316, as described above, to obtain one or both of an estimate of the resistance R and of the inductance L of the reluctance actuator 312.

In one embodiment, one or both of the estimates of the resistance and the inductance may then be used as feedback values to adjust operation of the feed-forward component 406. As an example, the estimated resistance value R may be used to determine how the output voltage 407 is determined from the input parameter 405. The adjustment may be made in real-time, such as during a time interval in which the voltage amplifier 408 is driving the reluctance actuator 312. Additionally and/or alternatively, the adjustment may be a quasi-static control, to adjust internal memory or parameters used by the feed-forward component 406 after the actuation.

In another embodiment, the estimated value of the inductance 319 may be used to adjust the LUT 404. This adjustment may be made as a quasi-static method of control after the actuation.

Figure 5:
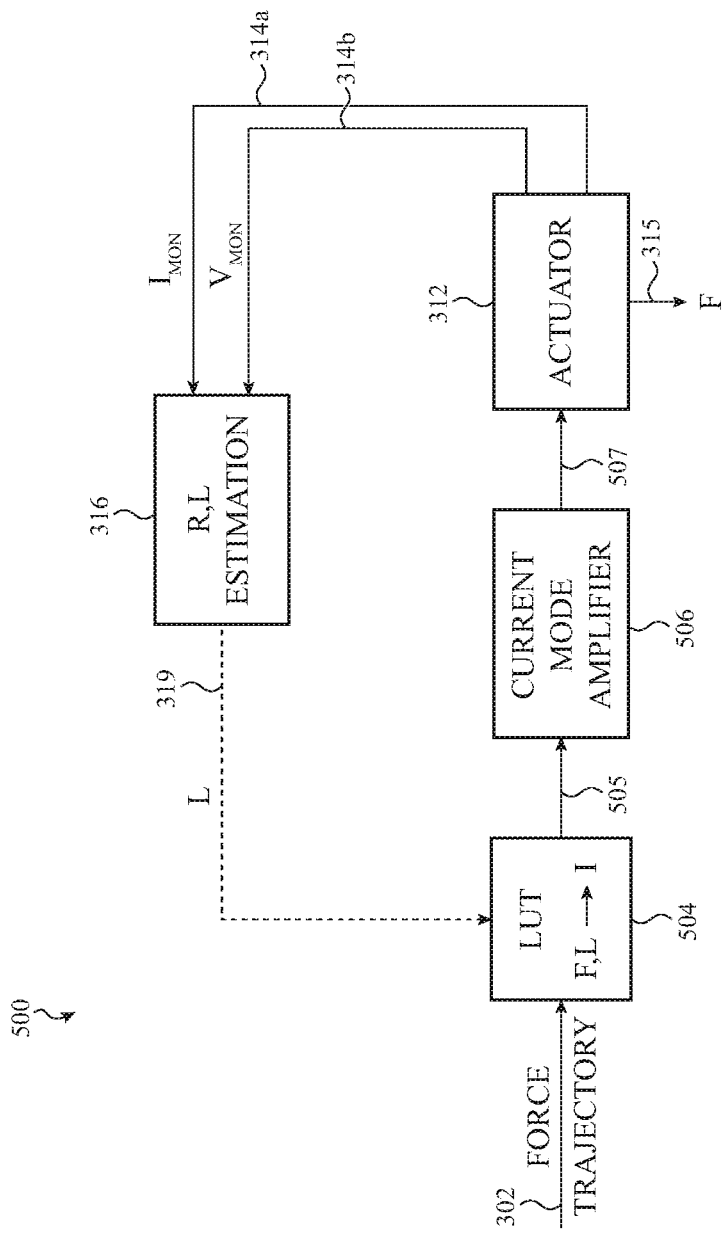
FIG. 5 is a block diagram of components of a control system that may be used with a reluctance actuator.

FIG. 5 is a block diagram of a system 500 for controlling the output force 315 applied by a reluctance actuator 312. The system 500 is based on the general system 300 of FIG. 3, and is directed to providing quasi-static, or non-real-time, feedback for control.

The system 500 is configured to receive a force trajectory 302, such as described above. The force trajectory 302 is used with the correlator component 504, which, in the specific example shown, is the look up table (LUT) 504. In other embodiments of the system 500, another form of correlator component may be used. The LUT 504 may be a 2-dimensional array that uses as inputs both the force trajectory 302 with a stored estimate of inductance of the reluctance actuator 312. The system 500 uses the force trajectory 302 with a stored estimate of the inductance of the reluctance actuator 312 to obtain an input parameter 505 to be applied or read by the current mode amplifier 506. In the system 500, the input parameter 505 is an electrical parameter value; in the case shown it is an input current value 505. This current value may be a value for current that the reluctance actuator 312 is to use during an actuation, or may be a value related to such a current (such as a digital representation thereof).

In the system 500, the current mode amplifier 506 may use the input current value 505 to determine an output drive value 507 of a current with which to drive the reluctance actuator 312 into actuation.

As described above, the current 314a and the voltage 314b of the reluctance actuator 312 may be measured or monitored during the actuation. The measured values of the current 314a and the voltage 314b may be used by the R/L estimation component 316, as described above, to an estimate 319 of the inductance L of the reluctance actuator 312.

That estimate may then be used to adjust the LUT 504. This adjustment may be made as a quasi-static method of control.

Figure 6:
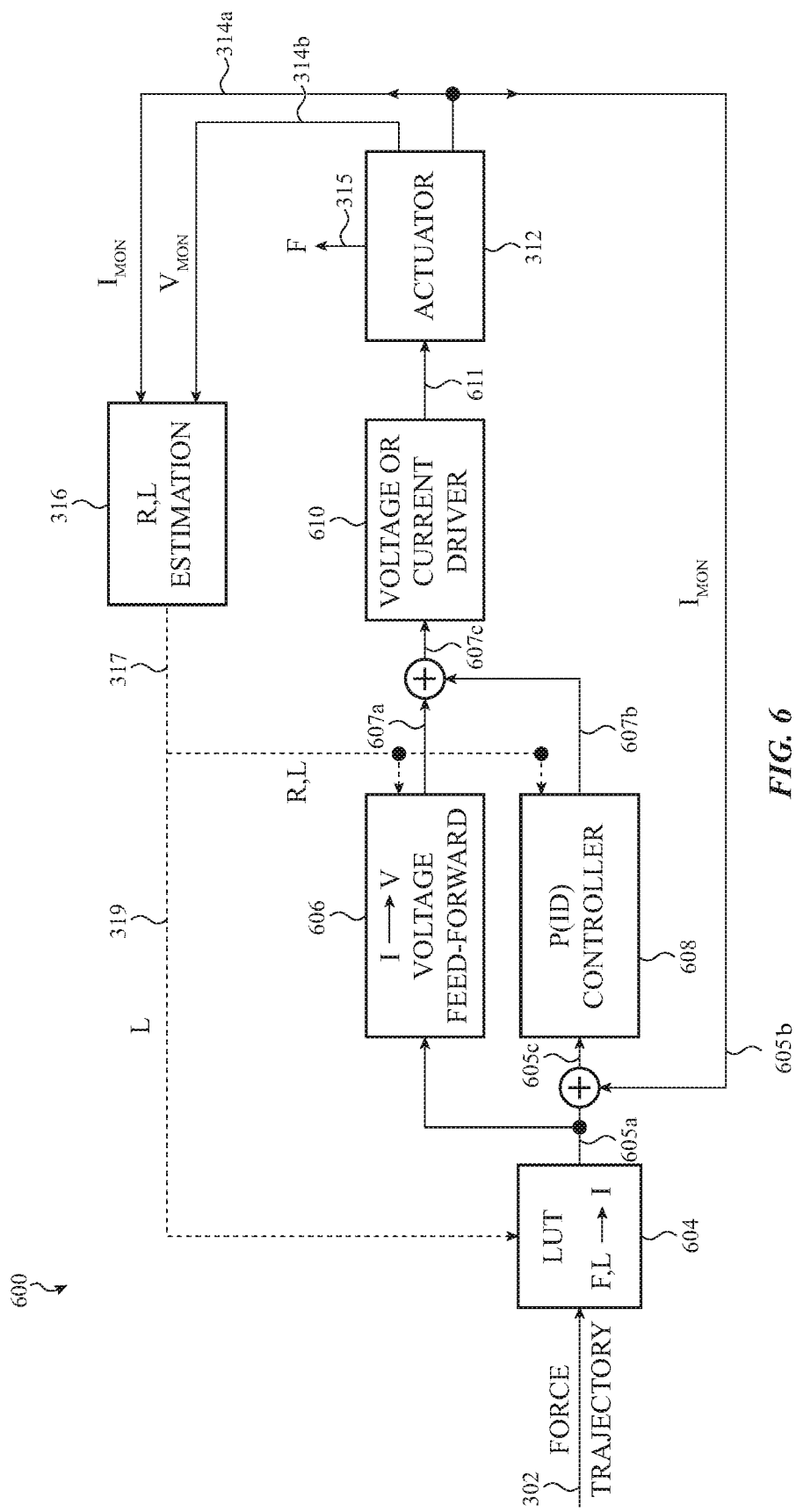
FIG. 6 is a block diagram of components of a control system that may be used with a reluctance actuator.

FIG. 6 is a block diagram of a system 600 for controlling the output force 315 applied by a reluctance actuator 312. The system 600 is based on the general system 300 of FIG. 3, and is directed to providing real-time feedback for control.

The system 600 is configured to receive a force trajectory 302, such as described above. The force trajectory 302 is used with a correlator component 604, which, in the specific example shown, is the look up table (LUT) 604. In other embodiments of the system 600, another form of correlator component may be used. The LUT 604 may be a 2-dimensional array that uses as inputs both the force trajectory 302 with a stored estimate of inductance of the reluctance actuator 312. The system 600 uses the force trajectory 302 with a stored estimate of the inductance of the reluctance actuator 312 to obtain an input parameter 605a to be applied or read as a first input by the controller element 608. The input parameter 605a may also be applied or read as an input to the feed-forward component 606. In the specific embodiment of FIG. 6, the input parameter 605a is an input current value (I), which may be a current value to be applied by the reluctance actuator 312 during an actuation, or may be a value related to such a current (such as a digital representation thereof).

The feed-forward component 606 of the system 600 may use the input parameter 605a to determine a first driver input value 607a. In the embodiment shown, the feed-forward component 606 produces a voltage value as the first driver input value 607a to be used by the driver component 610, which may be a voltage driver for the reluctance actuator 312. In other embodiments, the first driver input value 607a produced by the feed-forward component 606 may instead be a current value to be used in the case that the driver component 610 is a current driver for the reluctance actuator 312.

The controller element 608 of the system 600 may be based on proportional control, and may not use feedback, or may be a proportional/integral/derivative (PID) controller that accepts a feedback signal 605b. In the embodiment shown, the feedback signal 605b, is a current feedback signal, described further below. In the embodiments in which the controller element 608 accepts a feedback signal 605b, the input parameter 605a and the feedback signal 605b may be combined, either by differencing or additively, to produce a controller input signal 605c that is used by the controller element 608.

The controller element 608 may use the controller input signal 605c to determine a second driver input value 607b. In the embodiment shown, the controller element 608 produces a voltage value as the second driver input value 607b to be used by the driver component 610, which may be a voltage driver for the reluctance actuator 312. The first driver input value 607a and the second driver input value 607b may be combined (such as additively, averaging, or another method) to produce the combined driver input 607c applied to the driver component 610. The driver component 610 may then apply a corresponding output drive value or signal 611 to the reluctance actuator 312 to cause its actuation. The output drive value 611 may be a single constant value, or a time-varying signal.

As described above, the current 314a and the voltage 314b of the reluctance actuator 312 may be measured or monitored during the actuation. The measured values of the current 314a and the voltage 314b may be used by the R/L estimation component 316, as described above, to produce estimates 317 of the resistance R and of the inductance L of the reluctance actuator 312.

The estimate of the inductance L 319 of the reluctance actuator 312 may then be used to adjust the LUT 604. This adjustment may be made as a quasi-static method of control, such as by adjusting the LUT 604 after the actuation.

In some embodiments of the system 600, the estimates 317 of the resistance R and of the inductance L of the reluctance actuator 312 may be used to adjust operation of the feed-forward component 606 and/or the controller element 608.

The system 600 may use real-time feedback control, in which the measured value of at least one of the current 314a and the voltage 314b of the reluctance actuator 312 during the actuation is applied as the feedback signal 605b used by the controller element 608. If the actuation is of sufficient duration in time, the real-time feedback control may alter the current 314a and the voltage 314b of the reluctance actuator 312 during the actuation. The R/L estimation component 316 may use only values of the current 314a and the voltage 314b that occur at or near the end of the actuation to obtain the estimate of the inductance L 319 used to adjust the LUT 604.

Figure 7:
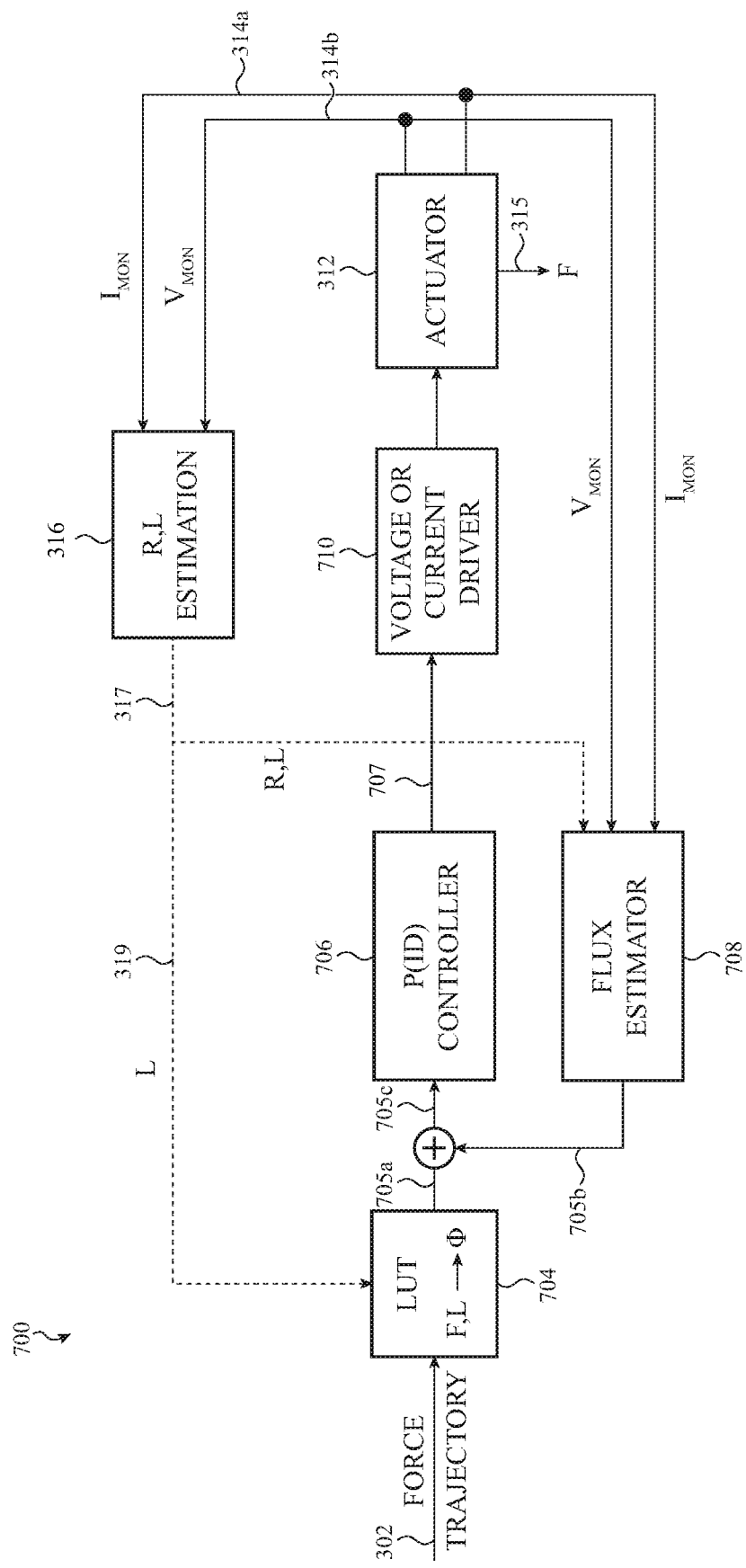
FIG. 7 is a block diagram of components of a control system that may be used with a reluctance actuator.

FIG. 7 is a block diagram of haptic output device 700 that includes various control electronic components to control an output force 315 applied by the reluctance actuator 312. The reluctance actuator 312 may be as described above, and may be configured with an electromagnet to induce movement of a metallic plate that is transferred as a haptic output to a surface of an electronic device that includes the haptic output device 700. The haptic output device 700 is configured to use real-time feedback control based on estimating the magnetic flux in the reluctance actuator 312. The estimates of the magnetic flux in the reluctance actuator 312 in turn may be based on monitored values of a current 314a and/or a voltage 314b across the reluctance actuator. The haptic output device 700 is also configured to use quasi-static feedback control, also based on monitored values of the current 314a and/or the voltage 314b across the reluctance actuator 312.

The control electronic components of the haptic output device 700 are configured to receive an intended force output or force trajectory 302 from a processor or other component of the electronic device. In the embodiment shown, the force trajectory 302 may be received by a correlator component 704 that may either be implemented as, or include, a LUT. The correlator component 704 may include a memory, which may be part of the LUT itself, and that includes one or more stored estimates of an inductance (L) of the reluctance actuator 312. A received force trajectory 302 and the stored estimates of the inductance may be used by the correlator component 704 to provide the input parameter 705a. In the embodiment shown, the input parameter 705a is an expected magnetic flux value ($\Phi$) to occur in the reluctance actuator 312.

The haptic output device 700 may include a controller element 706 that uses the expected magnetic flux 705a as a first input. The controller element 706 of the haptic output device 700 may be based solely on proportional control and not use feedback, or may be a proportional/integral/derivative (PID) controller that accepts a feedback signal 705b. In the embodiment shown, the feedback signal 705b is an estimated value of the magnetic flux, as described further below. The expected magnetic flux 705a and the feedback signal 705b may be combined (by differencing, averaging, or another method) to produce the controller input signal 705c used by the controller element 706.

The controller element 706 may provide a driver input value 707 that is used by the driver component 710. The driver component 710 may be a current amplifier or other current based driver, and the driver input value 707 may then be a current value. In alternative embodiments, the driver component 710 may be a voltage amplifier or other voltage based driver, and the driver input value 707 may then be a voltage value. The driver component 710 causes the reluctance actuator 312 to actuate and produce the actual output force 315 that is transmitted to a surface of the electronic device containing the haptic output device 700.

As described above, the current 314a and the voltage 314b of the reluctance actuator 312 may be measured or monitored during the actuation. The measured values of the current 314a and the voltage 314b may be used by the R/L estimation component 316, as described above, to produce estimates 317 of the resistance R and the inductance L of the reluctance actuator 312. The estimate 319 of the inductance L of the reluctance actuator 312 may then be used to adjust the LUT in the correlator component 704. This adjustment may be made as a quasi-static method of control, such as by adjusting the LUT within the correlator component 704 after the actuation.

The haptic output device 700 may use real-time feedback control as well as, or as an alternative to, the quasi-static method of control, in which the measured value of at least one of the current 314a and the voltage 314b of the reluctance actuator 312 during the actuation are by a flux estimator 708 to produce the feedback signal 705b. The feedback signal 705b may be an estimate of the magnetic flux produced in the reluctance actuator 312 during its actuation. The flux estimator 708 may also use the estimates 317 of the resistance R and of the inductance L of the reluctance actuator 312 to produce the estimate of the magnetic flux. The estimate of the magnetic flux may use parameters of the reluctance actuator known from manufacture, such as the cross-sectional area and number of windings.

In other embodiments, the feedback signal 705b giving the estimate of the magnetic flux may be provided directly by a magnetic flux sensor, such a Hall sensor, positioned near or in the reluctance actuator 312. Additionally and/or alternatively, a gap distance sensor may be included in the reluctance actuator 312 to provide a measurement of the gap between the metallic plate and the electromagnet of the reluctance actuator 312.

Figure 8:
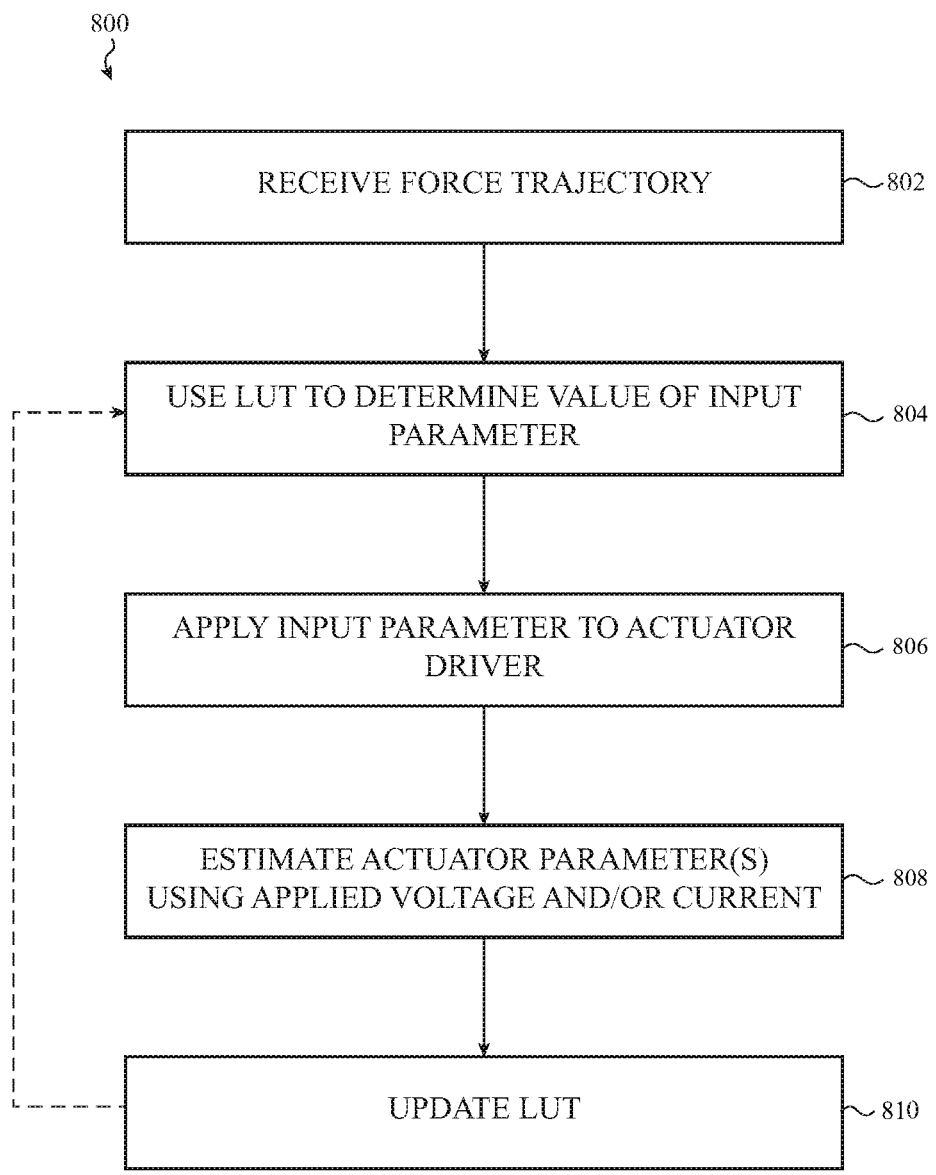
FIG. 8 is a flow chart of a method for controlling a reluctance actuator.

FIG. 8 is a block diagram of a method 800 for control of a force applied by a reluctance actuator, such as the reluctance actuator 200 of FIGS. 2A-B. The method 800 may be applied by an electronic device having the configurations of components and reluctance actuators as described previously, such as in relation to the embodiments of FIGS. 3-7.

At stage 802 a force trajectory or intended force output is received, such as by a control system or other electronic components controlling operation of a reluctance actuator. The intended force output may be provided to such a control system or components from a processor or another source, and may be based on an input received by the electronic device (such as a user input on a touch screen or other input mechanism) or on a state of the electronic device (such as an alarm time occurring). The intended force output may be different for different inputs to, or states of, the electronic device.

At stage 804, the method 800 uses the intended force output as at least one input value to use with a correlator component, which may be implemented as a look up table (LUT). Though for simplicity the correlator component is described as a LUT, another implementation of a correlator component may be used. The LUT may be implemented as a two-dimensional array, needing two supplied selection input values to select or produce a single output. The LUT may use the received intended force output and a stored estimated value of an electronic parameter of the reluctance actuator. In some embodiments the stored estimated value may be an estimated value of the inductance of the reluctance actuator.

In other embodiments, the LUT may be implemented as a three- (or higher) dimensional array, needing the intended force output together with two (or more) stored estimates of electrical parameter values of the reluctance actuator. For example, a three-dimensional LUT may take in an intended force output, a value for an inductance of the reluctance actuator, and a value of a resistance of the reluctance actuator.

At stage 804, the method 800 obtains an input parameter from the LUT, which may be a current, voltage, or magnetic flux signal, to use with electronic components that cause actuation of the reluctance actuator, such as an amplifier (e.g., voltage or current) or other form of actuator driver. The value of the input parameter from the LUT may be in a digital format that is read by the electronic components and used to produce an analog signal (e.g., voltage or current) that actuates the reluctance actuator.

At stage 806, the value of the input parameter determined using the LUT is used by the electronic components that cause actuation of the reluctance actuator. The electronic components that cause actuation may also receive and use other input values, such as a value of magnetic flux being produced by the reluctance actuator, as part of actuating the reluctance actuator. As another example, the electronic components may receive a current limit value that prevents them from applying too large a current to the reluctance actuator. Such a current limit value may vary over time, based on a temperature of the electronic device or on a remaining charge in a battery.

At stage 808, the method measures or monitors the voltage and/or current through the reluctance actuator. Based on the values of the voltage and/or current, parameters of the reluctance actuator are estimated. These parameters may be estimates for the force produced by the reluctance actuator during the actuation, an inductance and/or resistance of the reluctance actuator, or another parameter.

At stage 810, the LUT can be updated if it is found, for example, that a measured or inferred force output produced by the reluctance actuator differs from the received force trajectory or intended force output, and what was expected based on the input parameter obtained in stage 804. The LUT may also be updated if an estimated value of an inductance or resistance of the reluctance actuator, based on the measured voltage and/or current during the actuation, differs from respective values stored in the LUT.

The updated LUT may then be used with a subsequently received input force trajectory to improve accuracy of a subsequent force output by the reluctance actuator.

Figure 9:
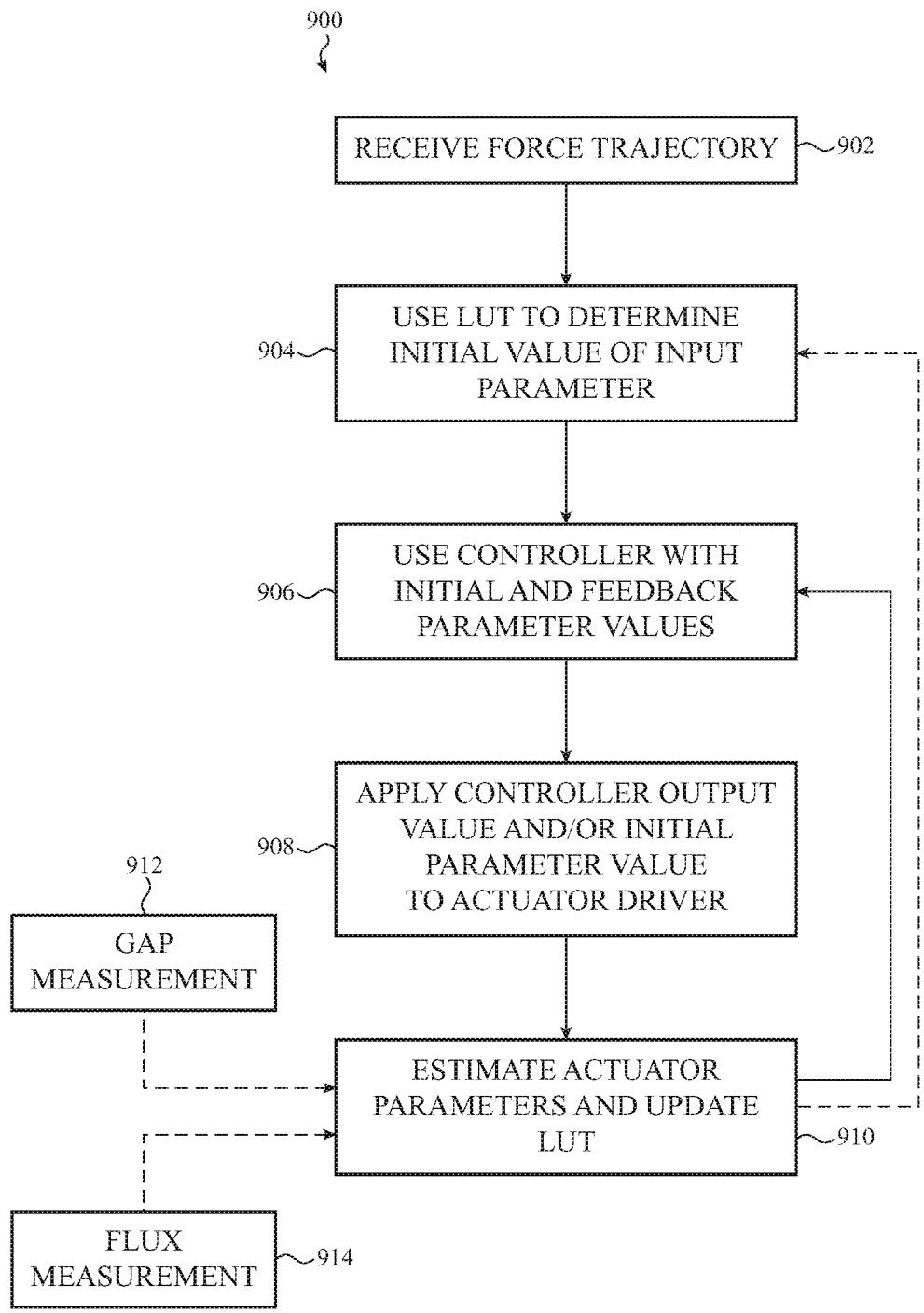
FIG. 9 is a flow chart of a method for controlling a force applied by a reluctance actuator.

FIG. 9 is a flow chart of a method 900 for control of a force applied by a reluctance actuator. The method 900 may be applied by an electronic device having certain of the configurations of components and reluctance actuators as described previously in relation to FIGS. 3, 6, and 7 to implement real-time control of a force output by a reluctance actuator. The method 900 also may include actions to implement quasi-static control of the force output.

At stage 902, a force trajectory or intended force output is received, such as by a control system or other electronic components controlling operation of a reluctance actuator. The intended force output may be provided to such a control system or components from a processor or another source, and may be based on an input received by the electronic device (such as a user input on a touch screen or other input mechanism) or on a state of the electronic device (such as an alarm time occurring). The intended force output may be different for different inputs to, or states of, the electronic device.

At stage 904, the method 900 uses the intended force output as at least one input value to use with a correlator component, which may be implemented as a look up table (LUT). Though for simplicity the correlator component is described as a LUT, another implementation of a correlator component may be used. The LUT may be implemented as a two-dimensional array, needing two supplied input values or parameters to select or produce a single output. The LUT may use the received intended force output and a stored estimate of an electronic parameter value of the reluctance actuator. In some embodiments the stored estimate may be an estimated value of the inductance of the reluctance actuator. As discussed previously, the LUT may be a three- or even higher dimensional, depending on the number quantities needed to look up a corresponding output value.

At stage 904, the method 900 also obtains an input parameter from the LUT, which may be a current, voltage, or magnetic flux signal, to use with electronic components that cause actuation of the reluctance actuator, such as an amplifier (e.g., voltage or current) or other form of actuator driver. The value of the input parameter from the LUT may be in a digital format that is read by the electronic components and used to produce an analog signal (e.g., voltage or current) that actuates the reluctance actuator.

At stage 906, the input parameter obtained from the LUT is received as a first input to a controller element. The controller element may also receive a feedback parameter value as its second input. The feedback parameter may be a current, such as current 314a, or may be a voltage, such as voltage 314b, as described above. The controller element can use the two inputs separately, or as a combination, to determine a controller output value to be applied to a driver component of the reluctance actuator.

At stage 908, the controller output value is applied by the driver component to actuate the reluctance actuator. The controller output value may be a current value, a voltage value, or another parameter value.

At stage 910, parameter values of the reluctance actuator may be estimated based on operational measurements of the reluctance actuator during the actuation. Such parameter values may include an inductance, a resistance, internal capacitances, and the like. The operational measurements may be of a current, a voltage, a magnetic flux in or near the reluctance actuator, or another operational measurement.

The estimated parameter values of the reluctance actuator can then be used as feedback, either for quasi-static or real-time feedback. One or more of the determined parameter values may be used by the controller element as part of real-time feedback control of the reluctance actuator's output force, as indicated by the solid feedback line.

Additionally and/or alternatively, one or more determined parameter values of the reluctance actuator, such as an inductance, may be used to update the LUT. Such an update may be performed after the actuation to implement quasi-static control.

In some embodiments of stage 910, additional operational measurements of the reluctance actuator may be obtained using sensors that do not directly measure the output force applied by the reluctance actuator. These additional operational measurements may include a measurement of a gap between a metallic plate and an electromagnet of the reluctance actuator. At stage 912, during the actuation the gap measurement may be made, such as by a capacitive or another type of sensor. The additional operational measurements may further include a measurement of a magnetic flux within the reluctance actuator. At stage 914, during the actuation the magnetic flux may be measured, such as by a Hall sensor mounted on the metallic plate. The magnetic flux sensor may be positioned on the metallic plate above the axis of the windings of the electromagnet.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of controlling a force applied by a reluctance actuator, comprising:
   receiving an intended force output to be applied by the reluctance actuator;
   obtaining from a correlator component, based at least on the intended force output and a stored estimate of an electrical parameter value of the reluctance actuator, an input parameter to be applied to the reluctance actuator;
   actuating the reluctance actuator by applying the input parameter to the reluctance actuator to cause an actuation of the reluctance actuator;
   obtaining at least one of a measurement of a current or a measurement of a voltage in the reluctance actuator during the actuation;
   estimating the electrical parameter value of the reluctance actuator using the at least one of the measurement of the current or the measurement of the voltage; and
   updating the stored estimate of the electrical parameter value of the reluctance actuator based on the estimation of the electrical parameter value of the reluctance actuator.

2. The method of claim 1, wherein the input parameter is at least one of a current applied by a current driver to the reluctance actuator or a voltage applied by a voltage driver to the reluctance actuator.

3. The method of claim 1, wherein:
the correlator component is look up table (LUT); and
the electrical parameter value of the reluctance actuator is an inductance of the reluctance actuator.

4. The method of claim 3, wherein updating the stored estimate of the inductance of the LUT occurs after the actuation.

5. The method of claim 1, further comprising obtaining, from a magnetic flux sensor, a measurement of the magnetic flux produced by the reluctance actuator.

6. The method of claim 5, wherein the measurement of the magnetic flux is used with the at least one of the measurement of the current or the measurement of the voltage to perform the operation of estimating an actual inductance of the reluctance actuator.

7. A haptic actuator comprising:
a reluctance actuator including:
a metallic plate; and
an electromagnet positioned adjacent to the metallic plate; and
control electronic components including:
a correlator component;
a driver component operably linked with the electromagnet; and
an estimation component;
wherein the control electronic components are operable to:
receive a force trajectory;
determine an input parameter for the driver component using the force trajectory with the correlator component;
apply the input parameter to the driver component to cause an actuation of the reluctance actuator;
monitor, by the estimation component, a voltage and a current in the reluctance actuator during the actuation; and
update the correlator component based on the monitored voltage and the monitored current in the reluctance actuator during the actuation.

8. The haptic actuator of claim 7, wherein:
the correlator component contains a memory implementing a look up table (LUT);
the LUT includes a stored estimate of an inductance of the reluctance actuator; and
the stored estimate of the inductance of the reluctance actuator is used with the force trajectory to determine the input parameter for the driver component.

9. The haptic actuator of claim 8, wherein updating the LUT includes updating the stored estimate of the inductance of the reluctance actuator.

10. The haptic actuator of claim 7, wherein:
the driver component is a current amplifier; and
the input parameter is an input current.

11. The haptic actuator of claim 7, wherein:
the driver component is a voltage amplifier; and
the input parameter is an input voltage.

12. The haptic actuator of claim 7, wherein:
the control electronic components further comprise a controller element;
the controller element is configured to provide a feedback control input to the driver component; and
the feedback control input is at least partially based on the monitored current value.

13. The haptic actuator of claim 12, wherein the control electronic components further include a magnetic flux estimator operable to:
determine an estimate of a magnetic flux in the reluctance actuator during the actuation based on the monitored voltage value and the monitored current value in the reluctance actuator; and
provide the estimate of the magnetic flux in the reluctance actuator to the controller element.

14. The haptic actuator of claim 13, wherein the control electronic components further include a magnetic flux sensor associated with the electromagnet and operable to:
obtain a measurement of the magnetic flux in the reluctance actuator during the actuation; and
provide the measurement of the magnetic flux to the magnetic flux estimator.

15. A method of control of a force applied by a reluctance actuator that includes an electromagnet and a flexible metallic plate, comprising:
receiving an intended force output;
obtaining from a correlator component, based on the intended force output and a stored value of an electrical parameter value of the reluctance actuator, an input parameter;
receiving, at a feedback controller, the input parameter and a feedback value of the electrical parameter value of the reluctance actuator;
applying, by the feedback controller, an input drive value to a driver component, the input drive value based on the input parameter and the feedback value of the electrical parameter value of the reluctance actuator;
applying, by the driver component, an output drive value to the electromagnet to actuate the reluctance actuator;
measuring a current in the reluctance actuator during the actuation; and
using the measurement of the current in the reluctance actuator during the actuation to determine the feedback value of the electrical parameter value of the reluctance actuator.

16. The method of claim 15, wherein:
the correlator component is a look up table (LUT);
the stored value of the electrical parameter value of the reluctance actuator is an initial value of an inductance; and
the input parameter is a current value.

17. The method of claim 16, wherein:
the input drive value is a first input drive value; and
the method further comprises:
determining, based on the input parameter, a second input drive value; and
applying, by a feed-forward component, the second input drive value to the driver component.

18. The method of claim 16, further comprising:
measuring a voltage in the reluctance actuator during the actuation;
determining an estimated resistance and an estimated inductance of the reluctance actuator based on the measured current and the measured voltage in the reluctance actuator during the actuation; and
updating the LUT by replacing the initial value of the inductance of the reluctance actuator with the estimated inductance of the reluctance actuator.

19. The method of claim 18, wherein the input parameter is an input value of a magnetic flux, and the method further comprises:
- estimating a magnetic flux in the reluctance actuator during the actuation based on the measured current and the measured voltage in the reluctance actuator during the actuation; and
- using the estimated magnetic flux in the reluctance actuator as the feedback value of the electrical parameter value received at the feedback controller.

20. The method of claim 16, wherein the input parameter is an input value of a magnetic flux, and the method further comprises:
- receiving, from a magnetic flux sensor associated with the electromagnet, a measurement of a magnetic flux in the reluctance actuator during the actuation; and
- using the measurement of the magnetic flux in the reluctance actuator during the actuation as the feedback value of the electrical parameter value received at the feedback controller.

\* \* \* \* \*